United States Patent
Imakawa et al.

(10) Patent No.: US 12,316,167 B2
(45) Date of Patent: May 27, 2025

(54) ROTOR CORE

(71) Applicants: TOYOTA JIDOSHA KABUSHIKI KAISHA, Toyota (JP); AISIN CORPORATION, Kariya (JP); DENSO CORPORATION, Kariya (JP)

(72) Inventors: Takashi Imakawa, Okazaki (JP); Yutaka Ueno, Nisshin (JP); Masahiro Horiuchi, Toyota (JP); Takuya Hashimoto, Ohbu (JP); Kenji Fukuzaki, Toyota (JP); Yusuke Yamamoto, Kariya (JP); Nobuhiro Asano, Kariya (JP)

(73) Assignees: TOYOTA JIDOSHA KABUSHIKI KAISHA, Toyota (JP); AISIN CORPORATION, Kariya (JP); DENSO CORPORATION, Kariya (JP)

( * ) Notice: Subject to any disclaimer, the term of this patent is extended or adjusted under 35 U.S.C. 154(b) by 209 days.

(21) Appl. No.: 18/003,581

(22) PCT Filed: Jul. 1, 2021

(86) PCT No.: PCT/JP2021/024889
§ 371 (c)(1),
(2) Date: Dec. 28, 2022

(87) PCT Pub. No.: WO2022/004834
PCT Pub. Date: Jan. 6, 2022

(65) Prior Publication Data
US 2023/0318378 A1    Oct. 5, 2023

(30) Foreign Application Priority Data
Jul. 2, 2020    (JP) .................................. 2020-114885

(51) Int. Cl.
H02K 1/28       (2006.01)
H02K 1/276      (2022.01)
(Continued)

(52) U.S. Cl.
CPC ............... H02K 1/28 (2013.01); H02K 1/276 (2013.01); H02K 1/32 (2013.01); H02K 7/003 (2013.01)

(58) Field of Classification Search
CPC .............................. H02K 1/28; H02K 7/003
See application file for complete search history.

(56) References Cited

U.S. PATENT DOCUMENTS 9,065,318 B2 *   6/2015   Komiya ............... H02K 1/28
2017/0264153 A1  9/2017   Groschup et al.

FOREIGN PATENT DOCUMENTS

DE    102017103107 A1 *  9/2017   ........... H02K 1/2753
JP    2013-099222 A       5/2013
JP    5469759 B1           4/2014

OTHER PUBLICATIONS

International Search Report for PCT/JP2021/024889 dated Sep. 14, 2021.

* cited by examiner

Primary Examiner — Ramon M Barrera
(74) Attorney, Agent, or Firm — Sughrue Mion, PLLC

(57) ABSTRACT

A rotor core includes a shaft hole, into which a shaft is inserted, and keys, which are protrusions corresponding to keyways of the shaft. A radial distance, which is the distance from the center of the shaft hole to an inner wall varies depending on the position in the circumferential direction of the shaft hole. The shaft hole includes key regions and increased diameter regions, in each of which the radial distance is longer than the radius of the shaft. Keys are respectively arranged in the key region. The shaft hole also (Continued)

includes contact regions, in which the shaft and the inner wall come into contact with each other when the shaft is inserted into the shaft hole. The contact regions are each located between the key regions or between the increased diameter regions. The contact regions are arranged at equal intervals in the circumferential direction.

4 Claims, 4 Drawing Sheets

(51) Int. Cl.
    *H02K 1/32*     (2006.01)
    *H02K 7/00*     (2006.01)

ROTOR CORE

CROSS REFERENCE TO RELATED APPLICATIONS

This application is a National Stage of International Application No. PCT/JP2021/024889 filed Jul. 1, 2021, claiming priority based on Japanese Patent Application No. 2020-114885 filed Jul. 2, 2020.

TECHNICAL FIELD

The present invention relates to a rotor core that is formed by stacking magnetic steel sheets.

BACKGROUND ART

Patent Literature 1 discloses a rotor core that includes keys in a shaft hole, into which a shaft is inserted. The keys are located at positions that correspond to the keyways of the shaft.

CITATION LIST

Patent Literature

Patent Literature 1: Japanese Laid-Open Patent Publication No. 2013-99222

SUMMARY OF INVENTION

Technical Problem

Since a shaft hole of a rotor core such as the one disclosed in Patent Literature 1 has keys, the inner diameter of the shaft hole is larger in portions close to the keys than in other portions. In a portion in which the inner diameter of the shaft hole is larger than the diameter of the shaft, the inner wall of the shaft hole and the shaft do not come into contact with each other when the shaft is inserted into the shaft hole. In such a rotor core, some portions of the inner wall of the shaft hole do not come into contact with the shaft, and the other portions come into contact with the shaft. Accordingly, only the portions of the inner wall of the shaft hole that are in contact with the shaft are pushed by the shaft. As a result, the portions of the inner wall that are pushed by the shaft expand outward in the radial direction of the shaft hole. On the other hand, the inner wall is stretched in the circumferential direction in a region between the portions that are pushed by the shaft and adjacent to each other in the circumferential direction of the shaft hole. As a result, the inner wall near the center of that region approaches the shaft, and the shaft hole may become distorted. In a rotor core including keys in the shaft hole, the inner diameter of the shaft hole is particularly increased in portions adjacent to each key due to manufacturing reasons. In such a case, at a position that is closest to the key in the circumferential direction, a portion of the inner wall near the boundary between a portion of the inner wall contacting the shaft and a portion that is not in contact with the shaft bulges toward the center of the shaft hole. Therefore, when the inner wall between the portions pushed by the shaft is stretched in the circumferential direction in a process in which the shaft hole is distorted, the bulging portions of the inner wall are pressed against the shaft. Then, load may be concentrated on a portion at which the bulging portion of the inner wall is in contact with the shaft.

Solution to Problem

In order to solve the above problem, according to a first aspect of the present invention, there is provided a rotor core that is formed by stacking magnetic steel sheets. The rotor core comprises a shaft hole into which a shaft is inserted and a key that is a protrusion. The key has a shape complementary to a shape of a keyway that is formed in the shaft to extend in an axial direction of the shaft. The key projects from an inner wall of the shaft hole and extends along a central axis of the shaft hole. The key is formed such that a gap exists between the key and the keyway in a state in which the shaft is inserted into the shaft hole. A radial distance, which is a distance from a center of the shaft hole to the inner wall of the shaft hole, varies depending on the position where the radial distance is measured in the circumferential direction of the shaft hole. The shaft hole includes key regions and increased diameter regions, having a combined total of three or more. The key is arranged in each key region. Each key region includes portions that are adjacent to the key and are located on opposite sides in the circumferential direction of the key. The radial distance is longer than a radius of the shaft in each of the portions. The radial distance of each increased diameter region is longer than the radius of the shaft. The key regions and the increased diameter regions are arranged in the circumferential direction. The shaft hole further includes contact regions on the inner wall of the shaft hole. Each of the contact regions is located between the key regions or between the increased diameter regions. The shaft and the inner wall come into contact with each other in each of the contact regions when the shaft is inserted into the shaft hole. The contact regions are arranged at equal intervals in the circumferential direction.

DESCRIPTION OF EMBODIMENTS

First Embodiment

A rotor core 10 according to a first embodiment will now be described with reference to FIGS. 1 to 4. The rotor core 10 is arranged inside a cylindrical stator core and forms a part of an electric motor.

Figure 1:
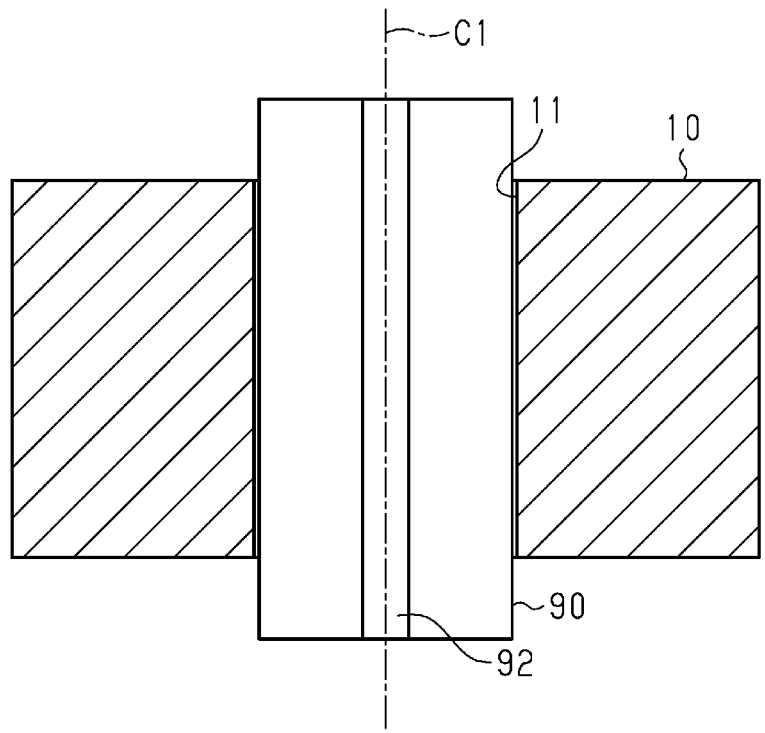
FIG. 1 is a cross-sectional view showing a rotor core according to a first embodiment.

FIG. 1 shows the cylindrical rotor core 10 and a shaft 90, which is a rotary shaft of the rotor core 10. The rotor core 10 is formed by stacking magnetic steel sheets machined to have an annular shape. For example, the rotor core 10 is manufactured through rotary lamination. The rotor core 10 includes a shaft hole 11, which is formed by holes at the center of the respective magnetic steel sheets. FIG. 1 shows a central axis C1 of the shaft hole 11. The magnetic steel sheets are stacked in the axial direction of the shaft hole 11.

The shaft 90 is inserted into the shaft hole 11 of the rotor core 10. The shaft 90 is columnar. The entire length of the shaft 90 is greater than the length of the shaft hole 11 along the central axis C1. The shaft 90 is fixed to the rotor core 10 with opposite ends of the shaft 90 exposed from the shaft hole 11.

Figure 3:
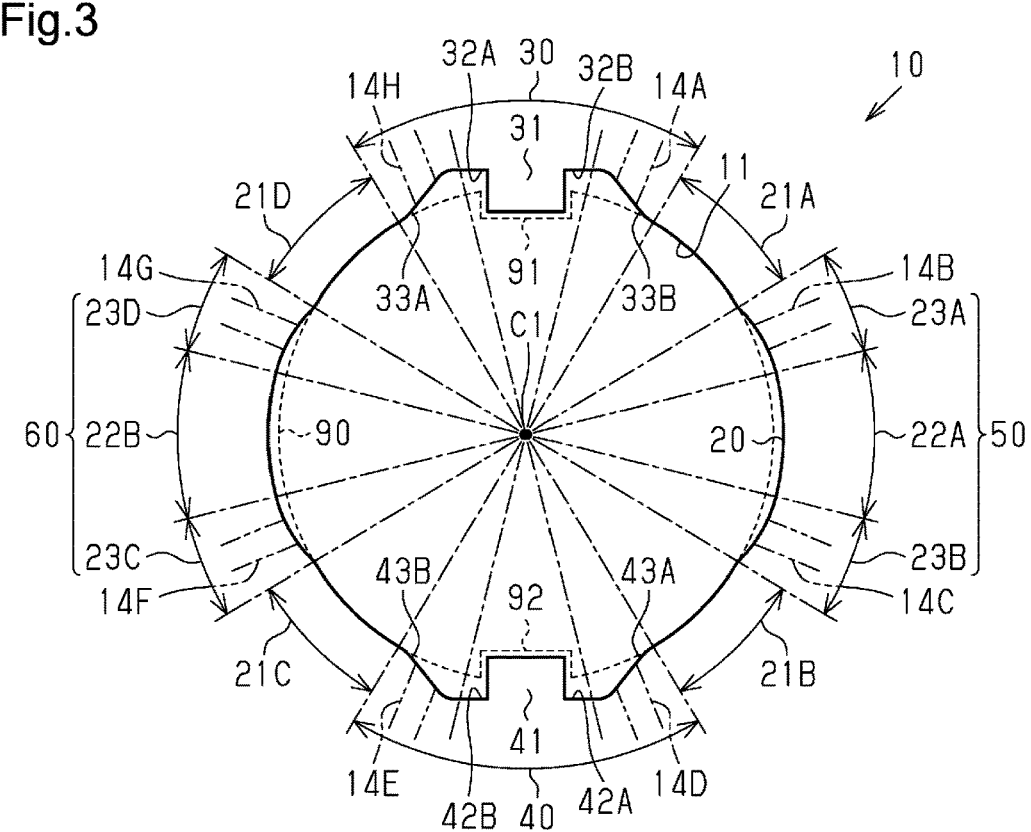
FIG. 3 is a schematic diagram showing a shaft hole of the rotor core.

The shaft 90 includes two keyways that extend in the axial direction of the shaft 90. One of the keyways is provided at a position on the opposite side of the other keyway by 180 degrees in the circumferential direction of the shaft 90. As shown in FIG. 3, the two keyways include a first keyway 91 and a second keyway 92. FIG. 1 shows only the second keyway 92.

Figure 2:
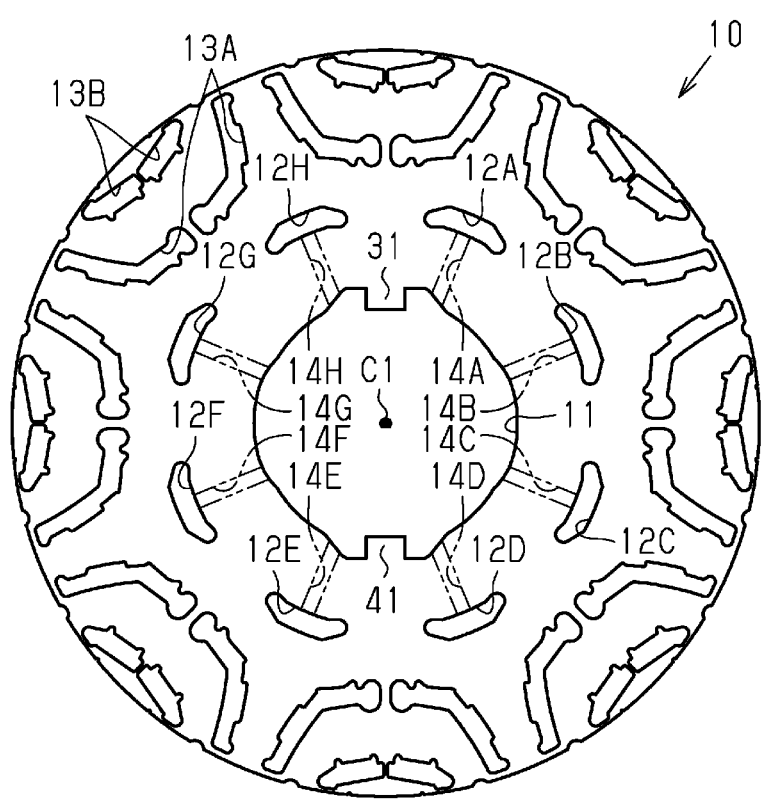
FIG. 2 is a front view of the rotor core.

FIG. 2 shows the rotor core 10 as viewed from one of the opposite open ends of the shaft hole 11. As shown in FIG. 2, the rotor core 10 includes first to eighth oil passages 12A to 12H on the radially outer side of the shaft hole 11. The first to eighth oil passages 12A to 12H are formed as holes that extend through the rotor core 10 in the axial direction of the central axis C1. The first to eighth oil passages 12A to 12H are arranged at equal intervals in the circumferential direction of the shaft hole 11. The first to eighth oil passages 12A to 12H are passages through which oil used to cool the rotor core 10 flows.

The rotor core 10 includes a first connecting passage 14A, which connects the first oil passage 12A and the shaft hole 11 to each other. The first connecting passage 14A is formed as a passage that extends in a direction orthogonal to the central axis C1, that is, in a radial direction of the rotor core 10. The first connecting passage 14A extends through the rotor core 10 from the inner wall of the first oil passage 12A to the inner wall of the shaft hole 11. The rotor core 10 includes second to eighth connecting passages 14B to 14H, which respectively connect the second to eighth oil passages 12B to 12H and the shaft hole 11 to each other. Like the first connecting passage 14A, the second to eighth connecting passages 14B to 14H are formed as passages that extend in directions orthogonal to the central axis C1. As shown in FIG. 2, the first to eighth connecting passages 14A to 14H are arranged radially from the central axis C1. Oil flows between the first to eighth oil passages 12A to 12H and the shaft hole 11 through the first to eighth connecting passages 14A to 14H. FIG. 2 schematically illustrates the first to eighth connecting passages 14A to 14H. The first to eighth connecting passages 14A to 14H do not necessarily need to extend linearly.

The rotor core 10 includes first magnet insertion holes 13A and second magnet insertion holes 13B on the radially outer side of the first to eighth oil passages 12A to 12H. The first and second magnet insertion holes 13A and 13B are formed to extend through the rotor core 10 along the central axis C1. Magnets are inserted into the first magnet insertion holes 13A and the second magnet insertion holes 13B.

The shape of the shaft hole 11 will now be described with reference to FIG. 3. In a cross section of the rotor core 10 orthogonal to the central axis C1 of the shaft hole 11, the shape of the shaft hole 11 in a plan view is the same at all positions from one open end to the other open end of the shaft hole 11. In FIG. 3, the rotor core 10 is shown by the solid line, and the shaft 90 is shown by the broken line.

As shown in FIG. 3, the shaft hole 11 is provided with a first key 31, which has a shape complementary to the first keyway 91 of the shaft 90, and a second key 41, which has a shape complementary to the second keyway 92. The first key 31 and the second key 41 protrude toward the central axis C1 from an inner wall 20 of the shaft hole 11. The first key 31 and the second key 41 are protrusions that extend along the central axis C1. The first key 31 is disposed at a position facing the second key 41.

The shaft 90 is press-fit into the shaft hole 11 of the rotor core 10. As will be described in detail below, the distance from the center of the shaft hole 11 to the inner wall 20 of the shaft hole 11 varies depending on the position in the circumferential direction of the shaft hole 11. Accordingly, when the shaft 90 is press-fit into the shaft hole 11, there are portions at which the shaft 90 is in contact with the inner wall 20 of the shaft hole 11 and portions at which there is a gap between the shaft 90 and the inner wall 20 of the shaft hole 11.

In a state in which the shaft 90 is inserted into the shaft hole 11, the first key 31 is inserted into the first keyway 91. Also, the second key 41 is inserted into the second keyway 92. The first key 31 and the first keyway 91 are formed into such shapes that a gap exists between the first key 31 and the first keyway 91 when the shaft 90 is inserted into the shaft hole 11. Likewise, the second key 41 and the second keyway 92 are formed into such shapes that a gap exists between the second key 41 and the second keyway 92 when the shaft 90 is inserted into the shaft hole 11.

A range in the shaft hole 11 where the first key 31 is located will be referred to as a first key region 30. A range in the shaft hole 11 where the second key 41 is located will be referred to as a second key region 40. In FIG. 3, imaginary straight lines that pass through the central axis C1 and extend in the radial direction of the shaft hole 11 are represented by long-dash short-dash lines. Each long-dash short-dash line represents a boundary between regions. The first key region 30 is disposed at a position facing the second key region 40. On the plane shown in FIG. 3, the length of the inner wall 20 in the first key region 30 is equal to the length of the inner wall 20 in the second key region 40. The length of a line segment connecting one end and the other end of each region on the inner wall 20 will be referred to as the width of the region. The width of a region corresponds to the length of a chord when the shaft hole 11 is considered as a circle. The width of the first key region 30 is equal to the width of the second key region 40.

Portions that are adjacent to the opposite ends of the first key region 30 in the circumferential direction of the shaft hole 11 are contact regions, in which the shaft 90 and the inner wall 20 come into contact with each other when the shaft 90 is inserted into the shaft hole 11. Also, portions that are adjacent to the opposite ends of the second key region 40 in the circumferential direction are contact regions, in which the shaft 90 and the inner wall 20 come into contact with each other when the shaft 90 is inserted into the shaft hole 11. The shaft hole 11 thus includes four contact regions.

Of the contact regions adjacent to the first key region 30, a contact region adjacent to the first key region 30 in the clockwise circumferential direction will be referred to as a first contact region 21A. As shown in FIG. 3, as the four contact regions, the first contact region 21A, a second contact region 21B, a third contact region 21C, and a fourth contact region 21D are arranged in that order in the clockwise direction from the first contact region 21A. The first key region 30 is disposed at a position between the fourth contact region 21D and the first contact region 21A. The second key region 40 is disposed at a position between the second contact region 21B and the third contact region 21C.

On the plane shown in FIG. 3, the length of the inner wall 20 in the first contact region 21A is equal to the length of the inner wall 20 in each of the second to fourth contact regions 21B to 21D. The width of the first contact region 21A is equal to the width of each of the second to fourth contact regions 21B to 21D. The first to fourth contact regions 21A to 21D are arranged at equal intervals in the circumferential direction.

The distance from the center of the shaft hole 11 to the inner wall 20 is defined as a radial distance. In each of the first to fourth contact regions 21A to 21D, the radial distance is constant. The radial distance in the first contact region 21A is equal to the radial distance in each of the second to fourth contact regions 21B to 21D.

On the inner wall 20 in the first key region 30, a first rounded shape 33A is formed in a portion continuous with the fourth contact region 21D. In the first rounded shape 33A, the radial distance increases toward the first key 31 from the boundary between the first key region 30 and the fourth contact region 21D. The first rounded shape 33A bulges toward the central axis C1. In the first key region 30, a first recess 32A is provided between the first rounded shape 33A and the first key 31. The radial distance of the first recess 32A is longer than the radial distance of the first rounded shape 33A. The first recess 32A is tapered in a direction away from the central axis C1. The first key region 30 includes a second recess 32B and a second rounded shape 33B on the side of the first key 31 opposite to the first rounded shape 33A. That is, the first key 31 is located between the first recess 32A and the second recess 32B. The first recess 32A and the second recess 32B are adjacent to the first key 31. In addition, the second rounded shape 33B is formed in a portion of the inner wall 20 in the first key region 30 that is continuous with the first contact region 21A.

The shape of the inner wall 20 in the second key region 40 is symmetrical to the shape of the inner wall 20 in the first key region 30. On the inner wall 20 in the second key region 40, a third rounded shape 43A is formed in a portion continuous with the second contact region 21B. In the third rounded shape 43A, the radial distance increases toward the second key 41 from the boundary between the second key region 40 and the second contact region 21B. The third rounded shape 43A bulges toward the central axis C1. In the second key region 40, a third recess 42A is provided between the third rounded shape 43A and the second key 41. The radial distance of the third recess 42A is longer than the radial distance of the third rounded shape 43A. The third recess 42A is tapered in a direction away from the central axis C1. The second key region 40 includes a fourth recess 42B and a fourth rounded shape 43B on the side of the second key 41 opposite to the third rounded shape 43A. That is, the second key 41 is located between the third recess 42A and the fourth recess 42B. The third recess 42A and the fourth recess 42B are adjacent to the first key 31. In addition, the fourth rounded shape 43B is formed in a portion of the inner wall 20 in the second key region 40 that is continuous with the third contact region 21C.

In a portion between the first contact region 21A and the second contact region 21B, the radial distance is longer than the radius of the shaft 90. In a portion between the third contact region 21C and the fourth contact region 21D, the radial distance is longer than the radius of the shaft 90.

The shaft hole 11 includes key regions and increased diameter regions, in which the radial distance is longer than the radius of the shaft 90. The shaft hole 11 includes key regions and increased diameter regions having a combined total of four. The shaft hole 11 includes two key regions and two increased diameter regions arranged in the circumferential direction. FIG. 3 shows a first increased diameter region 50 in a portion between the first contact region 21A and the second contact region 21B. The first contact region 21A and the second contact region 21B are adjacent to the first increased diameter region 50. FIG. 3 shows a second increased diameter region 60 in a portion between the third contact region 21C and the fourth contact region 21D. The third contact region 21C and the fourth contact region 21D are adjacent to the second increased diameter region 60. The first increased diameter region 50 is disposed at a position facing the second increased diameter region 60. On the plane shown in FIG. 3, the length of the inner wall 20 in the first increased diameter region 50 is equal to the length of the inner wall 20 in the second increased diameter region 60. The width of the first increased diameter region 50 is equal to the width of the second increased diameter region 60. FIG. 3 schematically illustrates portions in which the radial distance is longer than the radius of the shaft 90. The distances between the shaft 90 and the inner wall 20 in the key regions and the increased diameter regions do not represent the actual dimensional relationship.

The first contact region 21A is a region between the first key region 30 and the first increased diameter region 50. The second contact region 21B is a region between the first increased diameter region 50 and the second key region 40. The third contact region 21C is a region between the second key region 40 and the second increased diameter region 60. The fourth contact region 21D is a region between the second increased diameter region 60 and the first key region 30.

When the radial distance in the first to fourth contact regions 21A to 21D is defined as 1, the radial distance in the first increased diameter region 50 is longer than 1. The radial distance in the second increased diameter region 60 is also longer than 1.

A portion of the first increased diameter region 50 that is adjacent to the first contact region 21A will be referred to as a first adjacent region 23A. A portion of the first increased diameter region 50 that is adjacent to the second contact region 21B will be referred to as a second adjacent region 23B. A portion between the first adjacent region 23A and the second adjacent region 23B will be referred to as a first central region 22A. On the plane shown in FIG. 3, the length of the inner wall 20 in the first adjacent region 23A is equal to the length of the inner wall 20 in the second adjacent region 23B. In the first and second adjacent regions 23A and 23B, the radial distance gradually increases toward the first central region 22A. The radial distance is constant within the first central region 22A.

The shape of the inner wall 20 in the second increased diameter region 60 is symmetrical to the shape of the inner wall 20 in the first increased diameter region 50. A portion of the second increased diameter region 60 that is adjacent to the third contact region 21C will be referred to as a third adjacent region 23C. A portion of the second increased diameter region 60 that is adjacent to the fourth contact region 21D will be referred to as a fourth adjacent region 23D. A portion between the third adjacent region 23C and the fourth adjacent region 23D will be referred to as a second central region 22B. On the plane shown in FIG. 3, the length of the inner walls 20 in the third adjacent region 23C is equal to the length of the inner walls 20 in the fourth adjacent region 23D. In the third and fourth adjacent regions 23C and 23D, the radial distance gradually increases toward the second central region 22B. The radial distance is constant within the second central region 22B.

In the shaft hole 11, the first central region 22A of the first increased diameter region 50 is disposed at a position facing the second central region 22B of the second increased diameter region 60. In the rotor core 10, the second key 41 protrudes at a position separated clockwise by 90° from the middle position of the inner wall 20 in the first central region 22A. The first key 31 protrudes at a position separated clockwise by 90° from the middle position of the inner wall 20 in the second central region 22B. In other words, the first increased diameter region 50 is disposed at a middle position between the first key region 30 and the second key region 40 in the clockwise circumferential direction from the first key region 30. The second increased diameter region 60 is disposed at a middle position between the first key region 30 and the second key region 40 in the clockwise circumferential direction from the second key region 40.

Like the first rounded shape 33A of the first key region 30, a portion of the first adjacent region 23A of the first increased diameter region 50 that is continuous with the first contact region 21A bulges toward the central axis C1. Like the first adjacent region 23A, any portion of the adjacent regions of the first increased diameter region 50 and the second increased diameter region 60 that is continuous with a contact region bulges toward the central axis C1.

The first rounded shape 33A has a larger curvature than a portion of the adjacent region in each of the increased diameter regions 50, 60 that is continuous with a contact region, so that the first rounded shape 33A has a radial distance that increases as the distance from the contact region increases. Similarly, the second rounded shape 33B, the third rounded shape 43A, and the fourth rounded shape 43B each have a larger curvature than that of a portion of the increased diameter region that is continuous with the contact region. Therefore, the radial distance of a point separated by a specified distance in the circumferential direction from the boundary between a key region and a contact region is longer than that of an increased diameter region.

As shown in FIGS. 2 and 3, the first to eighth connecting passages 14A to 14H open to portions of the shaft hole 11 of which the radial distances are longer than the radius of the shaft 90. As shown in FIG. 3, the open ends of the first to fourth connecting passages 14A to 14D are respectively connected to the first key region 30, the first adjacent region 23A in the first increased diameter region 50, the second adjacent region 23B in the first increased diameter region 50, and the second key region 40. The open ends of the fifth to eighth connecting passages 14E to 14H are respectively connected to the second key region 40, the third adjacent region 23C in the second increased diameter region 60, the fourth adjacent region 23D in the second increased diameter region 60, and the first key region 30.

Operation of the first embodiment will now be described.

Figure 4:
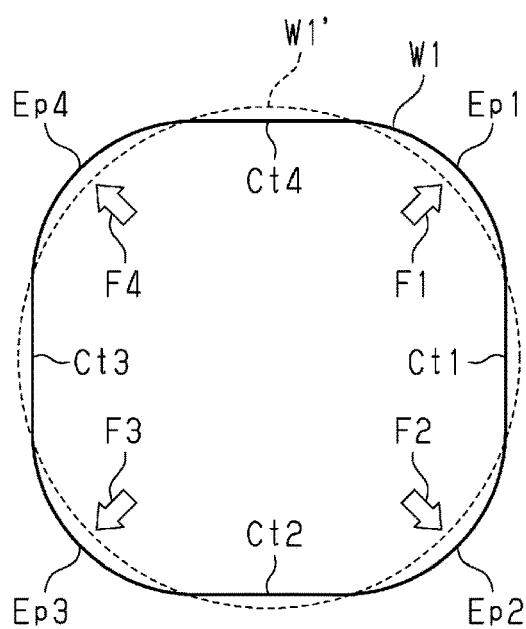
FIG. 4 is a schematic diagram showing a distorted state of the shaft hole of the rotor core.

FIG. 4 schematically shows the contour of the inner wall 20 in the shaft hole 11 of the rotor core 10. FIG. 4 shows the contour of the inner wall 20 before the shaft 90 is inserted as an inner wall contour W1' with a broken line. When the shaft 90 is inserted into the shaft hole 11, force with which the shaft 90 pushes the inner wall 20 outward in the radial direction is generated at portions where the inner wall 20 of the shaft hole 11 and the shaft 90 are in contact with each other. Therefore, when the shaft 90 is inserted into the shaft hole 11, the inner wall 20 is deformed by pushing forces from the shaft 90. The solid line in FIG. 4 shows the contour of the inner wall 20 after the shaft 90 has been inserted as a deformed contour W1.

As shown in FIG. 3, the shaft hole 11 is provided with the four contact regions 21A to 21D. A force with which the shaft 90 pushes the inner wall 20 is generated in each contact region. The outline arrows directed radially outward in FIG. 4 show forces with which the shaft 90 pushes the inner wall 20 as a first pushing force F1, a second pushing force F2, a third pushing force F3, and a fourth pushing force F4. In a portion on which the first pushing force F1 acts, the deformed contour W1 protrudes radially outward beyond the inner wall contour W1' as indicated by a first expanded portion Ep1. Likewise, in each of the portions on which the second to fourth pushing forces F2 to F4 act, respectively, the deformed contour W1 protrudes radially outward beyond the inner wall contour W1'. The portions that are respectively deformed by the second to fourth pushing forces F2 to F4 are indicated by a second expanded portion Ep2, a third expanded portion Ep3, and a fourth expanded portion Ep4, respectively. As indicated by the first to fourth expanded portions Ep1 to Ep4, the inner wall 20 is stretched in the circumferential direction when deformed.

The four contact regions 21A to 21D of the rotor core 10, which contact the shaft 90, are arranged at equal intervals. Accordingly, as shown in FIG. 4, the first to first to fourth pushing forces F1 to F4 are generated at positions at equal intervals in the circumferential direction. Since the contact regions 21A to 21D are arranged at equal intervals, a regular quadrangle is formed by sequentially connecting points on the inner wall contour W1' on which the first to fourth pushing forces F1 to F4 act. As a result of the inner wall 20 being evenly pushed by the first to fourth pushing forces F1 to F4, portions at equal intervals are expanded radially outward beyond the inner wall contour W1', as indicated by the first to fourth expanded portions Ep1 to Ep4 in the deformed contour W1.

The inner wall 20 does not contact the shaft 90 when the shaft 90 is inserted into the shaft hole 11 in the key regions 30, 40 and the increased diameter regions 50, 60, each of which is located between the corresponding ones of the contact regions 21A and 21D. The portions of the inner wall 20 in the contact regions adjacent to the key regions 30, 40 and the increased diameter regions 50, 60 are stretched in the circumferential direction like the first to fourth expanded portions Ep1 to Ep4. This causes a center portion of the inner wall 20 in each of the key regions 30, 40 and the increased diameter regions 50, 60 to approach the shaft 90. The deformed contour W1 is thus located radially inward of the inner wall contour W1' in the key regions 30, 40 and the increased diameter regions 50, 60. FIG. 4 shows portions where the deformed contour W1 is located radially inward of the inner wall contour W1' as a first contracted portion Ct1, a second contracted portion Ct2, a third contracted portion Ct3, and a fourth contracted portion Ct4. In each of the first to fourth contracted portions Ct1 to Ct4, the gap between the inner wall 20 and the shaft 90 is reduced as compared to the shaft hole 11 before being deformed, or the inner wall 20 contacts the shaft 90. In the rotor core 10, in which the shaft 90 is inserted into the shaft hole 11, the first to fourth expanded portions Ep1 to Ep4 are at equal intervals in the circumferential direction. Accordingly, the positions of the first to fourth contracted portions Ct1 to Ct4, each of which is located between corresponding ones of the expanded portions, are also located at equal intervals in the circumferential direction.

As described above, the present embodiment prevents any specific portion of the inner wall 20 of the shaft hole 11 from undergoing large deformation when the shaft 90 is inserted into the shaft hole 11. The inner wall 20 of the shaft hole 11 is deformed evenly as indicated by the deformed contour W1.

A rotor core of a comparative example will now be described with reference to FIG. 5. The solid line in FIG. 5 shows an inner wall contour W11' of the rotor core of the comparative example with a broken line, and a deformed contour W11.

Figure 5:
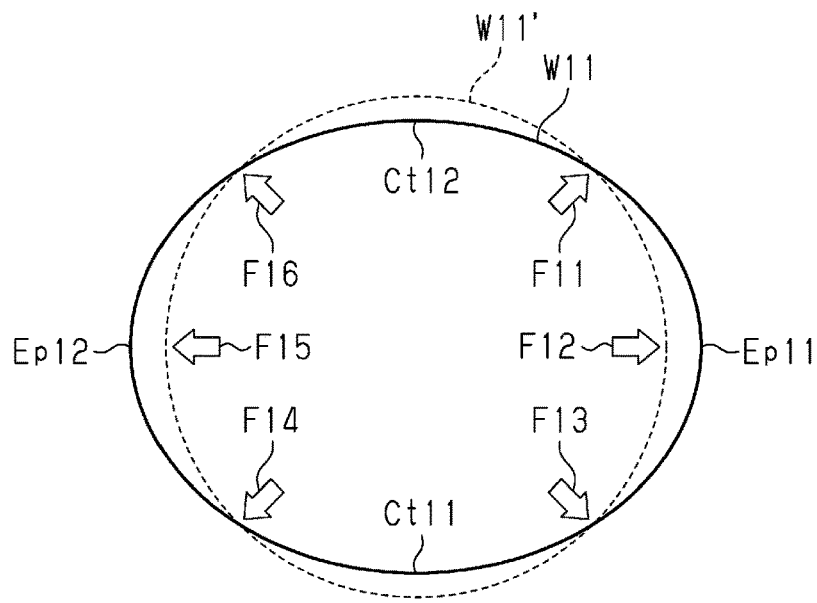
FIG. 5 is a schematic diagram showing a distorted state of the shaft hole of a rotor core in a comparative example.

The rotor core of the comparative example shown in FIG. 5 includes six contact regions. Accordingly, the shaft pushes the inner wall of the shaft hole inner wall at six positions. As shown in FIG. 5, second to sixth pushing forces F12 to F16 are arranged clockwise in that order from a first pushing force F11. In the rotor core of the comparative example, the contact regions are not arranged at equal intervals. Accordingly, the shaft does not evenly push the inner wall of the shaft hole, but unevenly pushes a certain portion of the inner wall of the shaft hole. Specifically, the first pushing force F11 and the third pushing force F13 act on positions near the second pushing force F12. Also, the fourth pushing force F14 and the sixth pushing force F16 act on positions near the fifth pushing force F15. The second pushing force F12 and the fifth pushing force F15 act on portions of the inner wall of the shaft hole that face each other.

When pushing forces with which the shaft pushes the inner wall of the shaft hole act on a certain portion of the inner wall in a concentrated manner, the inner wall of the shaft hole is significantly expanded in the direction of the second pushing force F12 and the direction of the fifth pushing force F15. FIG. 5 shows, as a first expanded portion Ep11, a portion in which the deformed contour W11 protrudes radially outward in the direction of the second pushing force F12 beyond the inner wall contour W11'. FIG. 5 also shows, as a second expanded portion Ep12, a portion in which the deformed contour W11 protrudes radially outward in the direction of the fifth pushing force F15 beyond the inner wall contour W11'. Since the inner wall of the shaft hole is significantly expanded in opposite directions as in the first expanded portion Ep11 and the second expanded portion Ep12, the inner wall of the shaft hole is significantly recessed radially inward from the inner wall contour W11' in the portions between the first expanded portion Ep11 and the second expanded portion Ep12. FIG. 5 shows portions where the deformed contour W11 is deformed to be located radially inward of the inner wall contour W11' as a first contracted portion Ct11 and a second contracted portion Ct12. As a result, in the rotor core of the comparative example, the inner wall of the shaft hole is deformed into an ellipse as represented by the deformed contour W11. The major axis of the ellipse is a line segment that passes through the center of the shaft hole to connect the first expanded portion Ep11 and the second expanded portion Ep12 to each other. The amount of deformation of the inner wall is relatively large in portions corresponding to the minor axis of the deformed contour W11, which has an elliptic shape. In this manner, if the contact regions are not arranged at equal intervals and pushing forces are applied to certain portions of the inner wall in a concentrated manner, the deformed shaft hole is likely to be distorted to a great extent. If a key region is disposed at a position at which the amount of deformation of the inner wall of the shaft hole is relatively large, a portion of the key region that is continuous with a contact region is strongly pressed against the shaft 90.

In contrast, in the rotor core 10, the central regions 22A, 22B are disposed between the first key region 30 and the second key region 40, and the first central region 22A and the second central region 22B are disposed to face each other. The shaft 90 and the inner wall 20 are thus not in contact with each other at positions between the first key region 30 and the second key region 40. Therefore, the shaft hole 11 is not deformed into an elliptical shape. The key regions 30, 40 are not disposed at positions where the amount of deformation of the inner wall of the shaft hole 11 is relatively large.

The first embodiment has the following advantages.

(1-1) In the rotor core 10, the first to fourth contact regions 21A to 21D are arranged at equal intervals in the circumferential direction. The shaft hole 11 as a whole is likely to be evenly deformed, preventing a specific portion of the shaft hole 11 from being distorted to a great extent. The rotor core 10 includes portions in which the shaft 90 does not contact the inner wall 20 of the shaft hole 11 when the shaft 90 is inserted into the shaft hole 11, and prevents a part of the shaft hole from undergoing large deformation, unlike the comparative example shown in FIG. 5.

(1-2) The rotor core 10 includes the first key region 30, the second key region 40, the first increased diameter region 50, and the second increased diameter region 60, which are disposed at equal intervals. Accordingly, the regions in which there is a gap between the shaft 90 and the inner wall 20 are arranged evenly. Accordingly, even if a part of the inner wall 20 that is not in contact with the shaft 90 approaches the shaft 90 during the process in which the shaft 90 is inserted into the shaft hole 11 so that the shaft hole 11 is deformed, the distortion of the entire shaft hole 11 is likely to be even, and the portions in which the inner wall 20 of the shaft hole 11 and the shaft 90 are in contact with each other are unlikely to be uneven after the deformation.

(1-3) The shaft hole 11 includes multiple bulging shapes that protrude toward the center of the shaft hole 11, such as portions of the key regions 30, 40 that are continuous with contact regions, and portions of the increased diameter regions 50, 60 that are continuous with contact regions. Therefore, if some of the bulging shapes are strongly pressed against the shaft 90 in the process of deformation of the shaft hole 11, a load may be concentrated on a portion in which the bulging shape is in contact with the shaft 90.

In this regard, in the rotor core 10, portions at which the inner wall 20 is deformed toward the center of the shaft hole 11 are likely to be located at equal intervals, as indicated by the first to fourth contracted portions Ct1 to Ct4 in FIG. 4. As a result, in the process in which the shaft 90 is inserted into the shaft hole 11 and the shaft hole 11 is distorted, the bulging shapes are likely to be pressed evenly against the shaft 90. That is, even if the inner wall 20 of the shaft hole 11 is deformed so as to approach the shaft 90, the configuration prevents any of the bulging shapes from being strongly pressed against the shaft 90, thereby preventing the load from being concentrated in any of the contact portions.

(1-4) In the rotor core 10, the first to eighth connecting passages 14A to 14H are each connected to an increased diameter region or a key region that is located between contact regions that are arranged at equal intervals. This configuration allows the contact regions to be arranged at equal intervals while causing each of the connecting passages 14A to 14H to be opened in a portion of the shaft hole 11 of which the radial distance is longer than the radius of the shaft 90. Accordingly, when the shaft 90 is inserted into the shaft hole 11, the open ends of the connecting passages 14A to 14H are prevented from coming into contact with the shaft 90. Also, when the shaft 90 is inserted, the openings of the connecting passages 14A to 14H are prevented from being deformed.

The first embodiment may be modified as follows.

Figure 6:
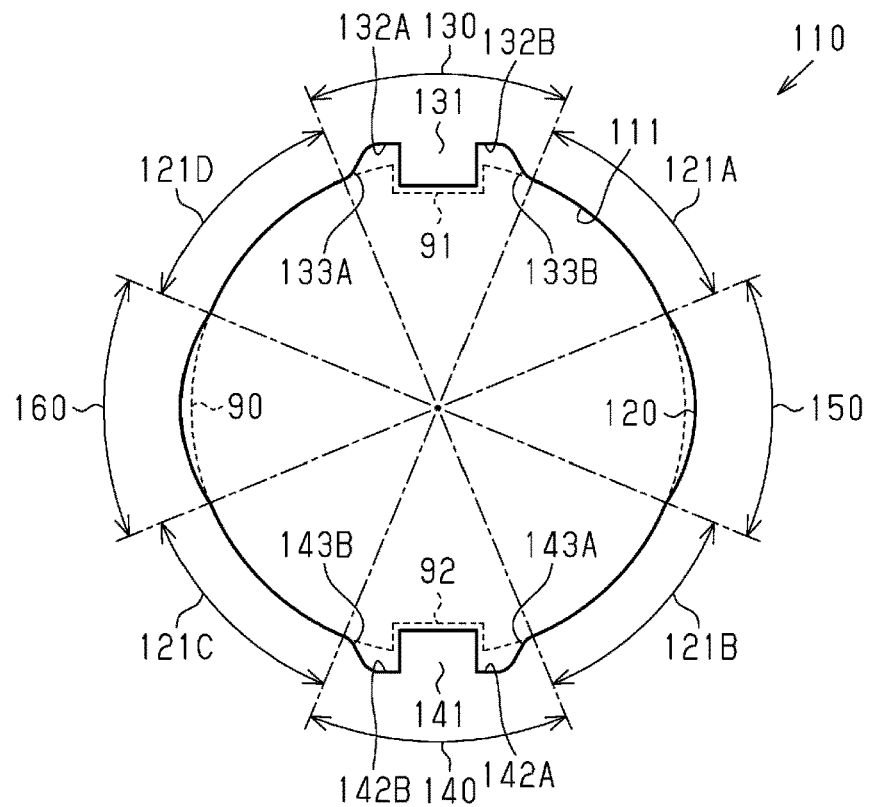
FIG. 6 is a schematic diagram showing a rotor core according to a modification.

FIG. 6 illustrates a rotor core 110 that includes a shaft hole 111. The shaft hole 111 includes two key regions, four contact regions, and two increased diameter regions as in the first embodiment. In the rotor core 110, the width of each region is different from that of the rotor core 10 of the first embodiment.

As shown in FIG. 6, the rotor core 110 includes a first key region 130. A first key 131, which is inserted into the first keyway 91 of the shaft 90, is disposed in the first key region 130. A first rounded shape 133A, a first recess 132A, a second recess 132B, and a second rounded shape 133B are formed in the first key region 130. The rotor core 110 includes a second key region 140. The second keyway 92 of the shaft 90 is located in the second key region 140. A third rounded shape 143A, a third recess 142A, a fourth recess 142B, and a fourth rounded shape 143B are formed in the second key region 140.

On an inner wall 120 of the shaft hole 111 of the rotor core 110, the first key region 130, a first contact region 121A, a first increased diameter region 150, a second contact region 121B, and the second key region 140 are arranged clockwise in that order from the first key region 130. The second key region 140, a third contact region 121C, a second increased diameter region 160, a fourth contact region 121D, and the first key region 130 are arranged clockwise in that order from the second key region 140. The first to fourth contact regions 121A to 121D are arranged at equal intervals in the circumferential direction.

In the rotor core 110, the width of the first contact region 121A is equal to the width of the first increased diameter region 150. As long as the contact regions are arranged at equal intervals, the same advantages as items (1-1) to (1-3) of the first embodiment can be achieved even if the width of each region is changed. In this manner, the width of each region is adjustable.

As in the first increased diameter region 150 and the second increased diameter region 160 of the rotor core 110, it is not necessary to distinguish a central region and adjacent regions from each other. A region in which the radial distance is constant may be present or absent in each increased diameter region. In the increased diameter region, it is preferable that the curvature be small in a portion in the increased diameter region that is continuous with a contact region. As the curvature of the portion continuous with the contact region decreases, the concentration of load due to contact between the portion continuous with the contact region and the shaft 90 is less likely to occur in the process in which the shaft hole is distorted.

Second Embodiment

A rotor core 210 according to a second embodiment will now be described with reference to FIG. 7. The rotor core 210 of the second embodiment is different from the rotor core 10 of the first embodiment in that the rotor core 210 includes six contact regions in which the shaft 90 and an inner wall 220 are in contact with each other when the shaft 90 is inserted into a shaft hole 211.

Figure 7:
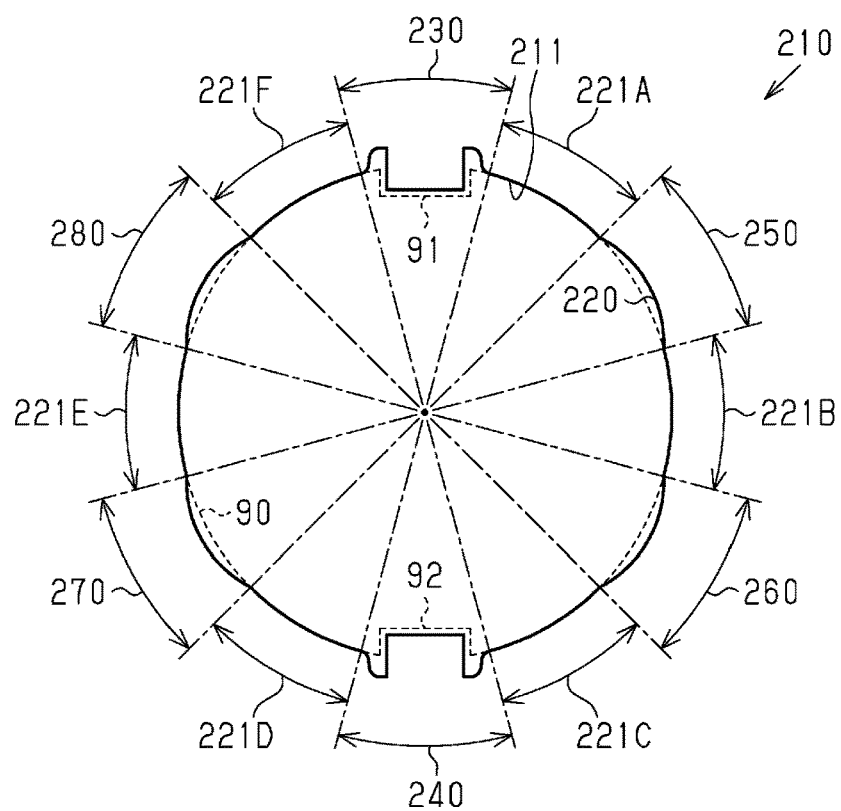
FIG. 7 is a schematic diagram showing a rotor core according to a second embodiment.

As shown in FIG. 7, the rotor core 210 includes a first key region 230 in the shaft hole 211. A key, which is inserted into the first keyway 91 of the shaft 90, is disposed in the first key region 230. A second key region 240 is provided in the shaft hole 211. A key, which is inserted into the second keyway 92 of the shaft 90, is disposed in the second key region 240.

Portions that are adjacent to the opposite ends of the first key region 230 in the circumferential direction of the shaft hole 211 are contact regions. Portions that are adjacent to the opposite ends of the second key region 240 in the circumferential direction are also contact regions. Further, in the rotor core 210, a middle position between the first key region 230 and the second key region 240 is a contact region.

The contact region adjacent to the first key region 230 in the clockwise circumferential direction will be referred to as a first contact region 221A. As the sixth contact regions, the first contact region 221A, a second contact region 221B, a third contact region 221C, a fourth contact region 221D, a fifth contact region 221E, a sixth contact region 221F are arranged clockwise in that order in the circumferential direction from the first contact region 221A. The first to sixth contact regions 221A to 221F are arranged at equal intervals.

The first key region 230 is disposed at a position between the sixth contact region 221F and the first contact region 221A. The second key region 240 is disposed at a position between the third contact region 221C and the fourth contact region 221D.

The rotor core 210 includes key regions and increased diameter regions having a combined total of six. Specifically, the rotor core 210 includes four increased diameter regions. The increased diameter region between the first contact region 221A and the second contact region 221B will be referred to as a first increased diameter region 250. The increased diameter region between the second contact region 221B and the third contact region 221C will be referred to as a second increased diameter region 260. The increased diameter region between the fourth contact region 221D and the fifth contact region 221E will be referred to as a third increased diameter region 270. The increased diameter region between the fifth contact region 221E and the sixth contact region 221F will be referred to as a fourth increased diameter region 280.

The second contact region 221B is located between the first increased diameter region 250 and the second increased diameter region 260. The fifth contact region 221E is located between the third increased diameter region 270 and the fourth increased diameter region 280.

On the plane shown in FIG. 7, the length of the inner wall 220 in the first contact region 221A is equal to the length of the inner wall 220 in each of the second to sixth contact regions 221B to 221F. The width of the first contact region 221A is equal to the width of each of the second to sixth contact regions 221B to 221F.

The length of the inner wall 220 in the first increased diameter region 250 is equal to the length of the inner wall 220 in each of the second to fourth increased diameter regions 260 to 280. The width of the first increased diameter region 250 is equal to the width of each of the second to fourth increased diameter regions 260 to 280. The width of the first increased diameter region 250 is equal to the width of each of the first and second key regions 230 and 240.

Operation and advantages of the second embodiment will now be described.

Unlike the comparative example shown in FIG. 5, the six contact regions are arranged at equal intervals in the shaft hole 211 of the rotor core 210. Accordingly, when the shaft 90 is inserted into the shaft hole 211, the distortion of the shaft hole 211 is likely to be even. A regular hexagon is formed by connecting points at which pushing forces are applied to the six contact regions, which are arranged at equal intervals.

As long as contact regions having the same width are arranged at equal intervals as in the rotor core 210, the same advantages as items (1-1) to (1-3) of the first embodiment are achieved.

The following are modifications commonly applicable to the above embodiments. The above-described embodiments and the following modifications can be combined as long as the combined modifications remain technically consistent with each other.

When connecting passages that connect oil passages and a shaft hole to each other are provided as in the rotor core 10 of the first embodiment, each of the connecting passages is preferably connected to a region in which the radial distance is longer than the radius of the shaft 90. This configuration achieves same advantage as items (1-4) of the first embodiment.

The number of the contact regions in the shaft hole of the rotor core may be changed. For example, eight contact regions may be arranged at equal intervals as shown in FIG. 8.

Figure 8:
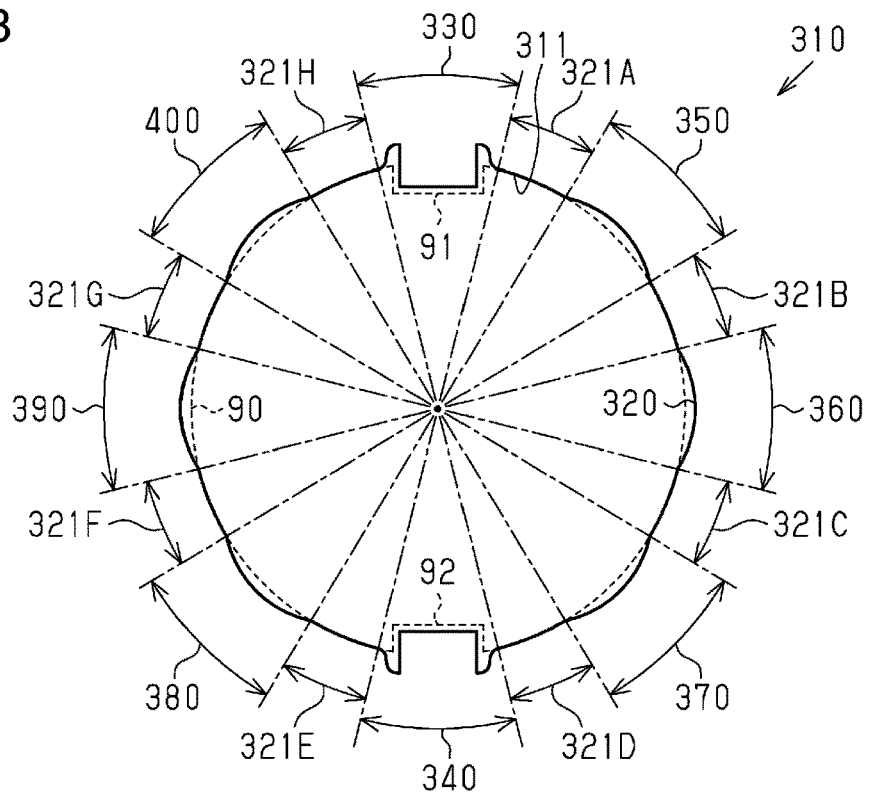
FIG. 8 is a schematic diagram showing a rotor core according to another modification.

A rotor core 310 shown in FIG. 8 incudes a first key region 330. A key, which is inserted into the first keyway 91 of the shaft 90, is disposed in the first key region 330. The rotor core 310 includes a second key region 340. A key, which is inserted into the second keyway 92 of the shaft 90, is disposed in the second key region 340. The rotor core 310 includes eight key regions and increased diameter regions having a combined total of eight. Specifically, a shaft hole 311 of the rotor core 310 is provided with six increased diameter regions.

On an inner wall 320 of the shaft hole 311 of the rotor core 310, the first key region 330, a first contact region 321A, a first increased diameter region 350, a second contact region 321B, a second increased diameter region 360, a third contact region 321C, a third increased diameter region 370, a fourth contact region 321D, and the second key region 340 are arranged clockwise in that order from the first key region 330. The second key region 340, a fifth contact region 321E, a fourth increased diameter region 380, a sixth contact region 321F, a fifth increased diameter region 390, a seventh contact region 321G, a sixth increased diameter region 400, an eighth contact region 321H, and the first key region 330 are arranged clockwise in that order from the second key region 340.

As shown in FIG. 8, the first to eighth contact regions 321A to 321H are arranged at equal intervals. On the plane shown in FIG. 8, the length of the inner wall 320 in the first contact region 321A is equal to the length of the inner wall 320 in each of the second to eighth contact regions 321B to 321H. The width of the first contact region 321A is equal to the width of each of the second to eighth contact regions 321B to 321H.

In the rotor core 310, which has the above-described configuration, distortion of the shaft hole 311 is likely to be even when the shaft 90 is inserted into the shaft hole 311, as in the above-described embodiments. A regular octagon is formed by connecting points at which pushing forces are applied to the eight contact regions, which are arranged at equal intervals.

In a rotor core in which contact regions are arranged at equal intervals, as the interval between two contact regions that are adjacent to each other in the circumferential direction decreases, the amount of radially inward deformation of the inner wall in a region between the two contact regions becomes smaller. For example, in a case in which contact regions are adjacent to the opposite ends of an increased diameter region in the circumferential direction, the amount of radially inward deformation of the inner wall in the increased diameter region is more likely to decrease as the width of the increased diameter region decreases. As a result, the inner wall is prevented from being strongly pressed against the shaft 90 when the inner wall is deformed toward the center of the shaft hole.

The interval between contact regions can be reduced by increasing the number of contact regions arranged in the circumferential direction or increasing the width of each contact region.

In the above-described embodiments, examples have been described in which recesses are formed adjacent to each key. Alternatively, rounded shapes may be adjacent to each key. That is, each key region may be formed by a key and two rounded shapes on the opposite sides of the key.

In the above-described embodiments, examples have been described in which the shape of the shaft hole is the same at all positions from one open end to the other open end of the shaft hole. However, the present invention is not limited to such a configuration. For example, at a position at a specified distance from one open end to the other open end of the shaft hole, the radial distance may be the same in regions except for key regions. In this case, the radial distance in the region except for the key regions may be longer than the radius of the shaft 90. Alternatively, the radial distance may have such a length that the inner wall contacts the shaft 90 inserted into the shaft hole.

In each of the above-described embodiments, the shaft 90 is fixed to the rotor core by being press-fit into the shaft hole. The method of fixing the shaft 90 is not limited to press-fitting. For example, the shaft 90 can be fixed to the rotor core by shrink fitting. Alternatively, the shaft 90 can be fixed to the rotor core by diffusion bonding. Even in a case in which the shaft 90 is not fixed by press-fitting, pushing forces may be generated if the shaft 90 comes into contact with the inner wall of the shaft hole when the shaft 90 is inserted into the shaft hole. This may deform the shaft hole. In each of the above-described embodiments, the contact regions, in which the shaft 90 and the inner wall of the shaft hole are in contact with each other, are arranged at equal intervals. Thus, even if the shaft 90 is fixed to the rotor core by a method other than press-fitting, the shaft hole is deformed evenly.

In each of the above-described embodiments, the shaft hole is provided with two keys. If the shaft hole is provided with key regions, in which keys are located, and increased diameter regions, having a combined total of three or more, the number of keys in the shaft hole may be one or more than two.

In each of the above-described embodiments, the two keys formed in the shaft hole are disposed at positions facing each other. The keys provided in the shaft hole do not necessarily need to face each other. For example, a configuration may be employed in which two key regions and one increased diameter region are disposed at the vertices of a triangle. Even in a case in which such a configuration is employed, deformation of the shaft hole at the time of insertion of the shaft is likely to be even as in each of the above-described embodiments, as long as the contact regions are disposed at equal intervals. In this case, a regular triangle is formed by connecting points at which pushing forces are applied. In this manner, if contact regions are arranged at equal intervals, the points on which pushing forces act are located at the vertices of a regular polygon.

When three or more contact regions are provided in the shaft hole, the widths of the contact regions are all the same, and when the contact regions are arranged at equal intervals, the entire shaft hole readily undergoes even deformation as in each of the above-described embodiments. For example, when the number of key regions and increased diameter regions combined is three, there are three contact regions, each of which is located between any two of the key regions and the increased diameter regions.

The invention claimed is:

1. A rotor core that is formed by stacking magnetic steel sheets, the rotor core comprising:
   a shaft hole into which a shaft is inserted; and
   a key that is a protrusion, the key having a shape complementary to a shape of a keyway that is formed in the shaft to extend in an axial direction of the shaft, and the key projecting from an inner wall of the shaft hole and extending along a central axis of the shaft hole, wherein
   the key is formed such that a gap exists between the key and the keyway in a state in which the shaft is inserted into the shaft hole,
   a radial distance, which is a distance from a center of the shaft hole to the inner wall of the shaft hole, varies depending on the position where the radial distance is measured in the circumferential direction of the shaft hole,
   the shaft hole includes key regions and increased diameter regions, having a combined total of three or more,
   the key is arranged in each key region,
   each key region includes portions that are adjacent to the key and are located on opposite sides in the circumferential direction of the key, the radial distance being longer than a radius of the shaft in each of the portions,
   the radial distance of each increased diameter region is longer than the radius of the shaft,
   the key regions and the increased diameter regions are arranged in the circumferential direction,
   the shaft hole further includes contact regions on the inner wall of the shaft hole, each of the contact regions being located between the key regions or between the increased diameter regions, and the shaft and the inner wall coming into contact with each other in each of the contact regions when the shaft is inserted into the shaft hole, and
   the contact regions are arranged at equal intervals in the circumferential direction, wherein
   each of the contact regions is one of a first contact region and a second contact region that are located on opposite sides of one of the increased diameter regions,
   each of the increased diameter regions includes:
      a first adjacent region that is adjacent to the first contact region;
      a second adjacent region that is adjacent to the second contact region; and
      a central region that is located between the first adjacent region and the second adjacent region,
   in each of the first adjacent region and the second adjacent region, a distance from the center of the shaft hole to the inner wall of the shaft hole gradually increases toward the central region, and
   the radial distance is constant within the central region.

2. The rotor core according to claim 1, wherein
   each of the key regions is one of a first key region and a second key region that are located at positions facing each other in the circumferential direction, and
   each of the increased diameter regions is arranged at a middle position between the first key region and the second key region.

3. The rotor core according to claim 2, wherein each of the contact regions is one of four or eight contact regions.

4. The rotor core according to claim 1, wherein
   each of the key regions is one of a first key region and a second key region that are located at positions facing each other in the circumferential direction,
   each of the contact regions is arranged at a middle position between the first key region and the second key region, and
   each of the contact regions is one of six contact regions.

* * * * *